G. W. BITNER.
Cattle and other Cars.
No. 156,756. Patented Nov. 10, 1874.
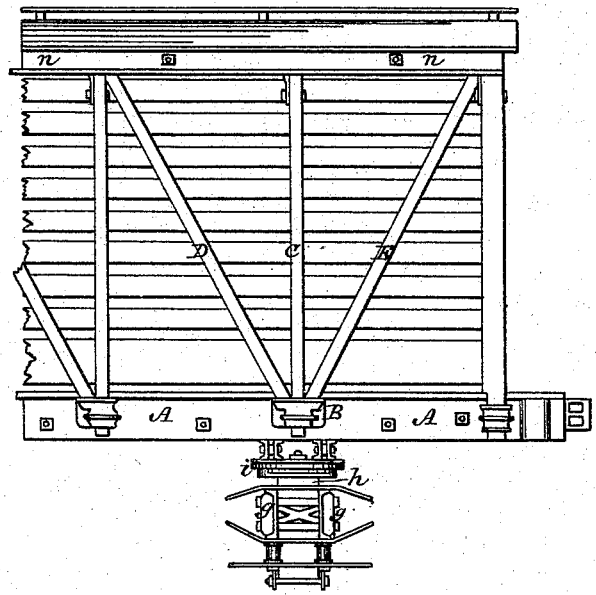
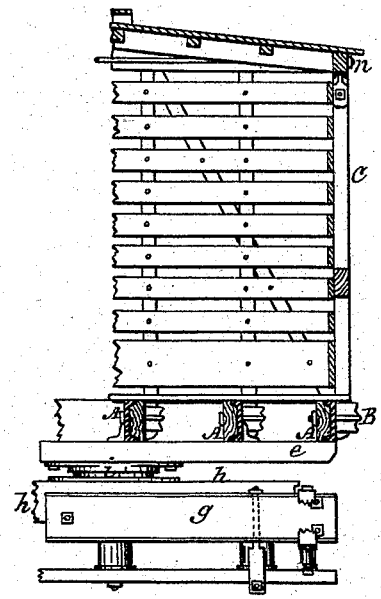
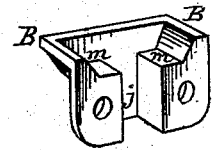
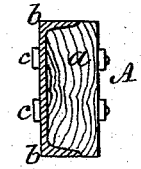
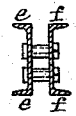
Witnesses.
D. R. Cowl
Edmund Masson
Inventor.
George W. Bitner
By atty. A. B. Stoughton.

UNITED STATES PATENT OFFICE.

GEORGE W. BITNER, OF PITTSBURG, ASSIGNOR OF ONE-HALF HIS RIGHT TO JAMES R. WILSON, OF ALLEGHENY, PENNSYLVANIA.

IMPROVEMENT IN CATTLE AND OTHER CARS.

Specification forming part of Letters Patent No. 156,756, dated November 10, 1874; application filed October 5, 1874.

*To all whom it may concern:*

Be it known that I, GEORGE W. BITNER, of Pittsburg, in the county of Allegheny and State of Pennsylvania, have invented certain new and useful Improvements in the Construction of Cars for Carrying Cattle and other uses; and that the following is a full, clear, and exact description of the same, reference being had to the accompanying drawings making a part of this specification, in which—

Figure 1 represents a side view of so much of a cattle-car as will illustrate my invention. Fig. 2 represents a sectional end elevation of a portion of the car. Figs. 3, 4, and 5 represent, on an enlarged scale, detached views of portions of the car, to better show their form and construction.

I am aware that both "angle" and "beam" iron have been combined with wood for forming stringers for cars. Angle-iron is light enough for the purpose, but it is difficult to combine wood with it with sufficient rigidity, as it has but a single angle or flange. Beam-iron is strong enough, and has two flanges, but it cannot be made light enough to be adaptable to the purpose. I therefore use neither of these kinds of iron; but propose to use "channel"-iron, which is light, strong, has an upper and under flange both, so that wood can be united with it to great advantage and with great economy; and my invention consists, first, in making the stringers of cattle and other cars of channel-iron, combined with wood, in the manner hereinafter explained. My invention further consists in a body-bolster or truck-beam composed of bars of channeled iron, as will be explained. My invention further in the construction of a truck-beam or bolster of combined channel-iron and wood, as will be explained.

In the construction of cars designed more particularly for the transportation of cattle and other animals there are other requisites than mere strength, with due regard to lightness, necessary. The droppings of the animals causes wood to decay so rapidly as to make that kind of a car not only perishable, but unsafe; and in cases of collision or other accident, the breaking down of a car, when of wood, causes great destruction of animal life.

To prevent this shivering of cattle-cars is one of the objects of my invention; and I have so arranged the longitudinal and transverse bearings of the car and truck as that, while the car may be practicably ruined by the bending of the iron bearings, there will be but little loss or damage to the cattle or other animals in the car. Channel-iron being cheap, strong, and more readily combined with wood than any other of the forms of iron used in structures of this kind, I avail myself of this form of iron for my purposes as being not only better, but much cheaper, than the heretofore-used forms of flanged iron.

To enable others skilled in the art to make and use my invention, I will proceed to describe the same with reference to the drawings, first premising that those parts of the car not herein particularly described may be of the ordinary well-known forms of construction.

The longitudinal beams of the car A extend throughout the entire length of the car, and are composed of a beam of wood, $a$, dressed upon one side to fit into the channel of a bar of channel-iron, $b$, and bolted thereto, as at $c$. Such a beam is light and strong, affords all the facilities for laying and fastening, as well as repairing, the plank-floors of the car, and in case of collision or a "break down" prevents the car from crushing in and killing or otherwise injuring the animals being transported therein; and as the wood part of car decays or becomes weakened by the filth and droppings of the animals, such parts can be readily removed and replaced. Any suitable number of these longitudinal beams or stringers may be used, according to the size and capacity of the car to be built. The body-bolster (better seen in Fig. 5) is composed of two bars or pieces of channel-iron, $e\ f$, placed back to back, and united by through-bolts, which pass through bosses, washers, or plates laid between said bars to keep them at slight distances apart, as seen in Fig. 5. Two of these combined pieces are used for each body-bolster, as seen at Fig. 1, and they are firmly united to the stringers A. The truck-bolster, as at $g$, Fig. 1, is composed of combined wood and iron, like the stringers A, and embrace between them the wooden bolster-beam $h$, upon which the friction or turning plates *i* rest, and to this truck-bolster is applied, in the usual way, the usual truck-irons, springs, &c. The pockets B, for receiving and holding the vertical brace *c*, and the two diagonal braces D E of each set of such bracings throughout the car, are made of cast-iron, and are bolted to the outside of the outside stringers of the car. Each of these pockets contain a central recess, *j*, (Fig. 3,) for the vertical brace C, and on each side of the central recess *j* a skew-back, *m*, for the foot or lower end of each of the diagonal braces D E. The tops of the braces C D E, instead of coming directly against the wood of the roof timber *n*, may rest against a channel-iron interposed between them, which gives the sides and body of the car great rigidity.

Having thus fully described my invention, what I claim in the construction of cattle and other similar cars is—

1. The stringers A, composed of wood *a*, fitted into the grooved side of a beam of channel-iron, *b*, and bolted thereto and combined therewith, as and for the purpose described.

2. The body-bolster, composed of two bars of channel-iron, *e f*, bolted together, and combined and secured under the stringers, as and for the purpose described.

3. The truck-bolster *g*, composed of the two combined wood and iron pieces, and embracing the wood bolster *h*, all combined as and for the purpose described.

GEORGE W. BITNER.

Witnesses:
A. B. STOUGHTON,
EDMUND MASSON.